United States Patent
Tidwell et al.

[11] Patent Number: 5,969,871
[45] Date of Patent: Oct. 19, 1999

[54] VIRTUAL RETINAL DISPLAY WITH LENS ARRAY FOR EXPANDING EXIT PUPIL

[75] Inventors: Michael Tidwell; Joel S. Kollin, both of Seattle; Richard S. Johnston; Charles D. Melville, both of Issaquah, all of Wash.

[73] Assignee: University of Washington, Seattle, Wash.

[21] Appl. No.: 08/824,359

[22] Filed: Mar. 25, 1997

Related U.S. Application Data

[63] Continuation-in-part of application No. 08/624,950, Mar. 29, 1996, Pat. No. 5,701,132.
[51] Int. Cl.⁶ .................................................. G02B 27/10
[52] U.S. Cl. .................................................. 359/620
[58] Field of Search .................................. 359/620, 630; 349/95, 200

[56] References Cited

U.S. PATENT DOCUMENTS

| | | | |
|---|---|---|---|
| 3,453,035 | 7/1969 | Walther | 350/162 |
| 3,547,520 | 12/1970 | Lee et al. | 350/144 |
| 5,164,848 | 11/1992 | Firth et al. | 359/13 |
| 5,467,104 | 11/1995 | Furness, III et al. | 345/8 |
| 5,587,836 | 12/1996 | Takahashi et al. | 359/630 |
| 5,596,339 | 1/1997 | Furness, III et al. | 345/8 |
| 5,886,760 | 3/1999 | Ueda et al. | 349/95 |

FOREIGN PATENT DOCUMENTS

| | | |
|---|---|---|
| 2406168 | 1/1974 | Germany. |
| 9427177 | 11/1994 | WIPO. |

OTHER PUBLICATIONS

Tidwell et al., The Virtual Retinal Display—A Retinal Scanning Imaging System,: Virtual Reality World '95; Feb. 1995.

*Primary Examiner*—Georgia Epps
*Assistant Examiner*—Ricky Mack
*Attorney, Agent, or Firm*—Steven P. Koda

[57] ABSTRACT

A display device is achieved using a simplified optical system which generates an expanded exit pupil without compromising magnification or resolution. Modulated light from a source is converged toward a focal point by an optics subsystem. A scanning subsystem deflects the converging light, and thus the focal point, along a raster pattern to define an intermediate image plane. A lens array defines a surface which coincides with the image plane. The lens array includes a plurality of lenses and a polymer dispersed liquid crystal film. The film serves to spread incident light and thus form an expanded exit pupil.

19 Claims, 7 Drawing Sheets

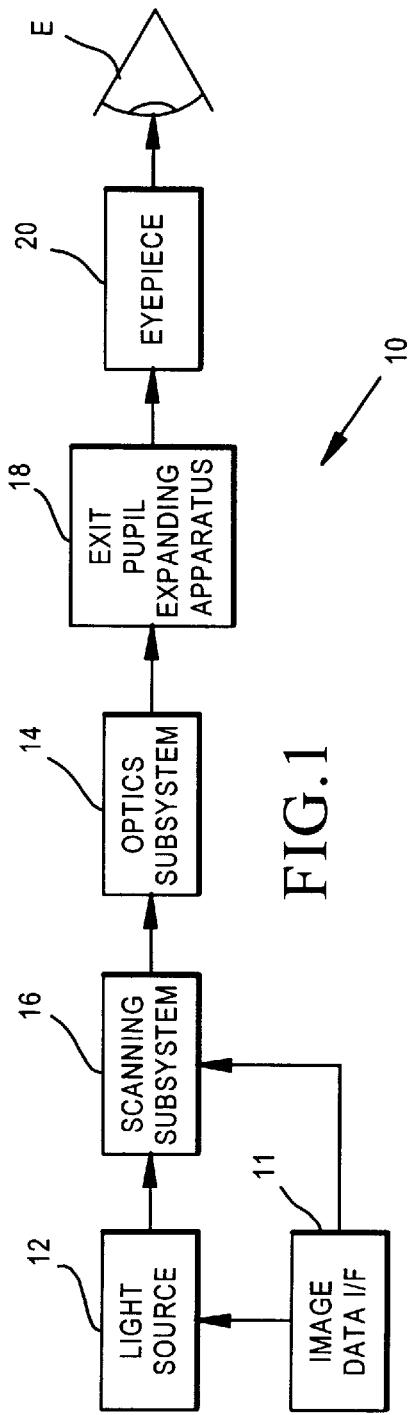
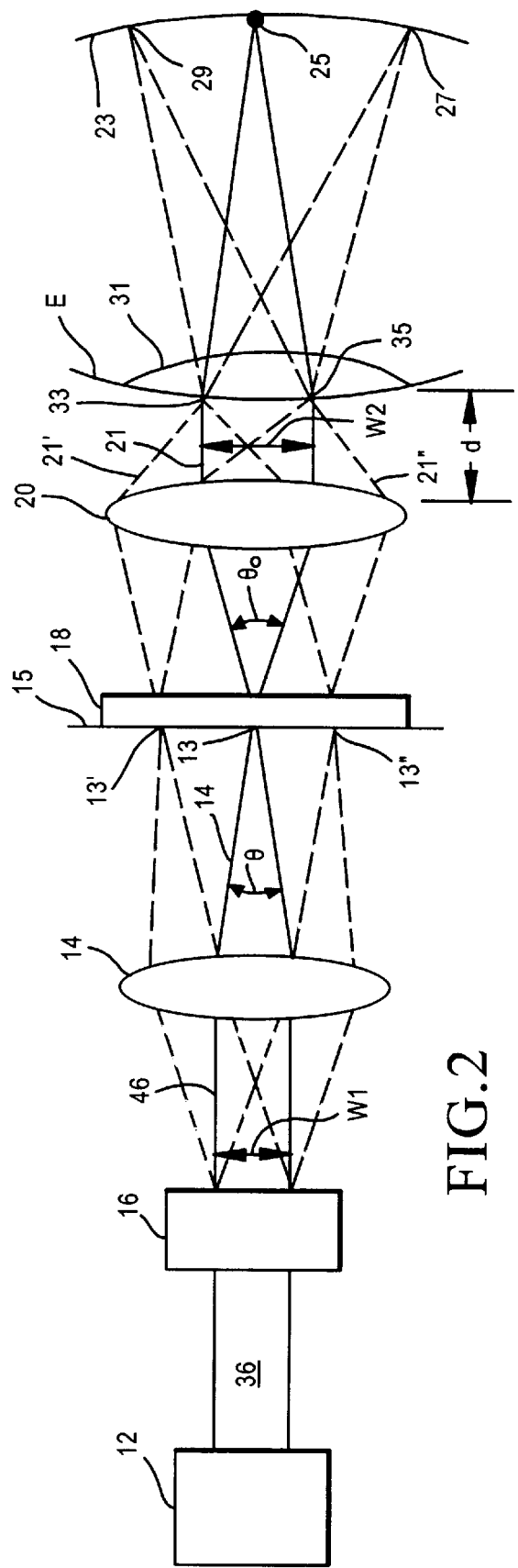
FIG.1
FIG.2

5,969,871

VIRTUAL RETINAL DISPLAY WITH LENS ARRAY FOR EXPANDING EXIT PUPIL

CROSS REFERENCE TO RELATED APPLICATION

This is a continuation-in-part of U.S. patent application Ser. No. 08/624,950 filed Mar. 29, 1996 now U.S. Pat. No. 5,701,132 for "Virtual Retinal Display with Expanded Exit Pupil."

BACKGROUND OF THE INVENTION

This invention relates to retinal display devices, and more particularly to optical configurations for retinal display devices and a method and apparatus for defining an exit pupil through which a user views an image.

A retinal display device is an optical device for generating an image upon the retina of an eye. Conventional retinal scanning displays use a coherent light source which is scanned in raster fashion onto the retina. Light is emitted from a light source, collimated through a lens, then passed through a scanning device. The scanning device defines a scanning pattern for the light. In a pre-objective scanning subsystem, the scanned light passes through an objective lens which converges the light to focus an image. Conventionally such light is converged to a flat image plane. The light then diverges beyond the plane. An eyepiece is positioned along the light path beyond the objective lens at some desired focal length. An "exit pupil" occurs shortly beyond the eyepiece in an area where a viewer's eye pupil is to be positioned.

A viewer looks into the eyepiece to view an image. The eyepiece receives light that is being deflected along a raster pattern. Light thus impinges on the viewer's eye pupil at differing angles at different times during the scanning cycle. This range of angles determines the size of the image perceived by the viewer. Modulation of the light during the scanning cycle determines the content of the image.

Typically the exit pupil defined by the display device is less than 2 mm in diameter and often less than 1 mm in diameter. The viewer's eye pupil varies from approximately 2 mm in diameter under bright light to approximately 7 mm in a dark room. Because of the small exit pupil, a first step for a viewer is to adjust eye position to find the exit pupil. The viewer's pupil needs to achieve and maintain alignment with the display device's exit pupil. While in alignment, the light scans directly onto the viewer's retina without any intermediary screens, cathode ray tubes (CRT's) or liquid crystal display devices (LCD's). The result is an image perceived by the viewer.

A shortcoming of the conventional retinal display is the difficulty of maintaining alignment between the exit pupil and the viewer's pupil. If the viewer moves, alignment may be lost. Movement is problematic because a viewer has a tendency to move their eye when intending to view a peripheral portion of the image. Even blinking may cause movement of the eye. As a result, conventional exit pupils are inconvenient for the viewer. In particular a lay consumer using a virtual retinal display would find the alignment requirement difficult to maintain for entertainment or other long term viewing applications. Accordingly there is a need for a retinal display device having an exit pupil defined so as to enable easier viewing of the image.

Other shortcomings of conventional retinal display devices include the display's size and weight. As the retinal display device is to be positioned in the vicinity of a viewer's eye, there is a need to achieve a lightweight compact display device.

SUMMARY OF THE INVENTION

According to the invention, a lightweight, compact retinal display device is achieved using a simplified optical system which generates an expanded exit pupil without compromising magnification or resolution.

According to one aspect of the invention, the exit pupil expanding apparatus is formed by a lens array. The lens array includes several small lenses in which each lens has a diameter on the order of 5–100 microns. Each lens is spaced as closely as possible to each adjacent lens in the array. The array defines either a flat plane or a curved plane according to alternative embodiments of this invention. Such plane receives the light from the scanning device and coincides with the location of an intermediate image plane. Light enters each lens over a given narrow angle, then exits over an enlarged angle. By creating an exit angle greater than the incident angle, the exiting light impinges upon a larger surface of the ensuing eyepiece.

According to another aspect of the invention, the lens array includes a polymer dispersed liquid crystal film formed at a surface of the lenses within the array. The PDLC film is a uniaxial birefringent liquid crystal material cooled in a manner for microdroplets to form in a polymer suspension. Each droplet has a refractive index director associated with the droplet's ordinary axis and extraordinary axis. At different curvatures along each director, the index of refraction varies. The effect of each droplet is to bend light locally at a boundary between different indices of refraction. This is referred to herein as a microlensing effect which serves to spread light passing through the lens array. The cumulative effect of the film is to spread the light beam passing through the lens array, and thus, expand the exit pupil to be formed beyond the eyepiece.

One advantage of this invention is that a viewer has less difficulty aligning and maintaining alignment with an exit pupil formed at the eyepiece. In particular, the expanded exit pupil makes it easier for a viewer to align with an exit pupil. These and other aspects and advantages of the invention will be better understood by reference to the following detailed description taken in conjunction with the accompanying drawings.

BRIEF DESCRIPTION OF THE DRAWINGS

FIG. 1 is a block diagram of a virtual retinal display according to an embodiment of this invention;

FIG. 2 is an optical schematic of the virtual retinal display of FIG. 1;

DESCRIPTION OF SPECIFIC EMBODIMENTS

Overview

Figure 3:
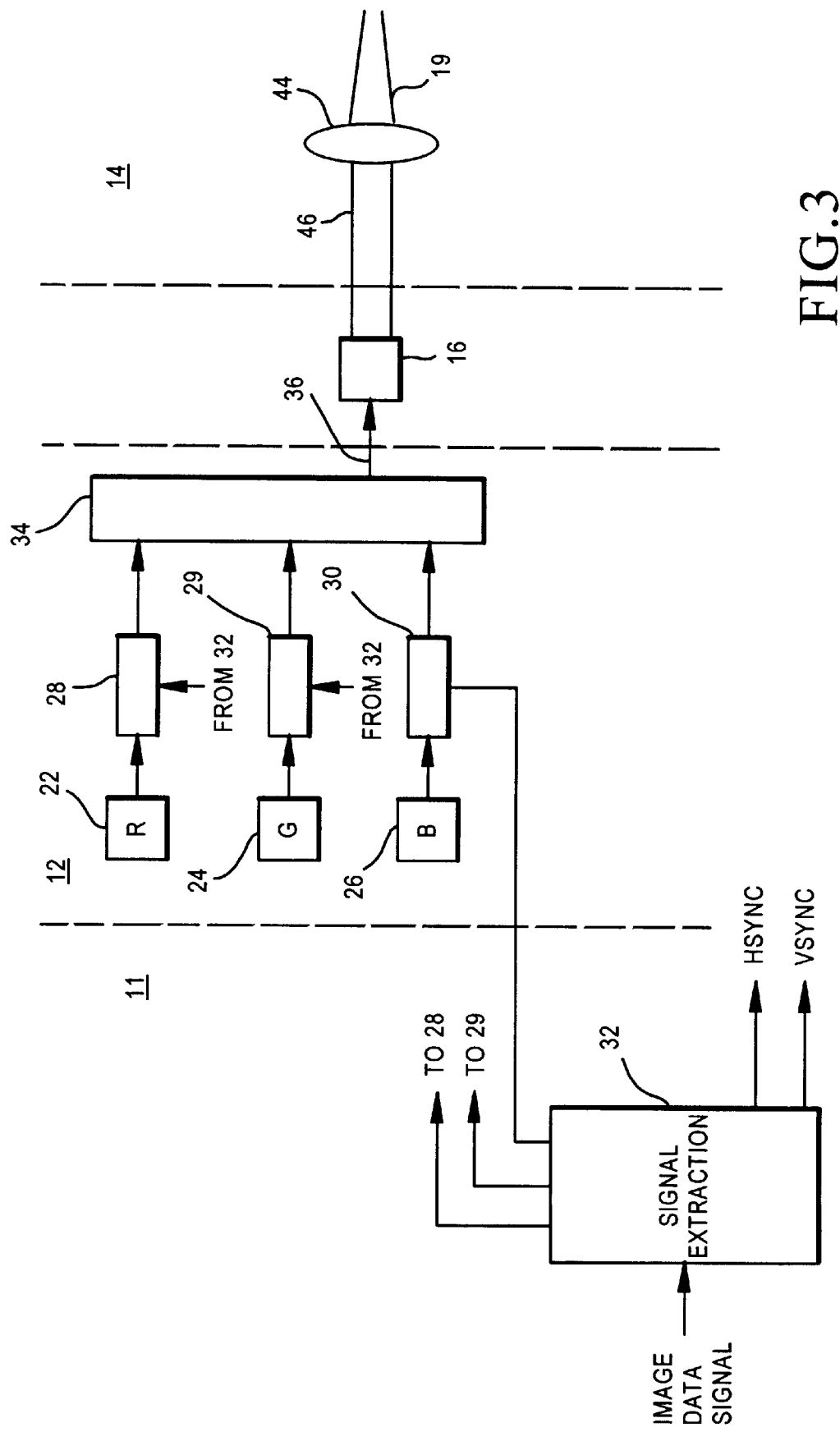
FIG. 3 is a block diagram of the image data interface, light source, and optics subsystem of FIG. 1 according to an embodiment of this invention.

FIG. 1 shows a block diagram of a virtual retinal display 10. The display 10 receives image data from a computer device, video device or other digital or analog image data source. Light generated by the display 10 is altered according to the image data to scan an image into the retina of a viewer's eye E.

The retinal display 10 generates and manipulates light to create color or monochrome images having narrow to panoramic fields of view and low to high resolutions. Light modulated with video information is scanned directly onto the retina of a viewer's eye E to produce the perception of an erect virtual image. The retinal display is small in size and suitable for hand-held operation or for mounting on the viewer's head.

The retinal display 10 includes an image data interface 11, a light source 12, a scanning subsystem 16, an optics subsystem 14, an exit pupil expanding apparatus 18, and an eyepiece 20. The image data interface 11 receives a video or other image signal, such as an RGB signal, NTSC signal, VGA signal or other formatted color or monochrome video or image data signal. The light source 12 includes one or more sources of light. In one embodiment red, green, and blue light sources are included. The light sources or their output beams are modulated according to the input image data signal content to produce light which is input to an optics subsystem 14. Preferably the emitted light is spatially coherent.

The emitted light 36 is deflected by the scanner subsystem 16. Typically the light is deflected along a raster pattern, although in an alternative embodiment another display format such as vector imaging can be used. In one embodiment the scanning subsystem 16 receives a horizontal deflection signal and a vertical deflection signal derived from the image data interface 11. In another embodiment, the scanning subsystem includes a mechanical resonator for deflecting passing light.

Referring to FIG. 2, deflected light 46 output from the scanning subsystem 16 is received at the optics subsystem 14. The optics subsystem 14 serves as an objective to focus the light. The light 19 exiting the optics subsystem 14 converges toward a focal point 13 at intermediate image plane 15. The scanning subsystem 16 over a deflection cycle causes the focal point to form at different locations. The pattern of a changing focal point 13, 13', 13" defines the intermediate image plane 15.

The exit pupil expanding apparatus 18 is positioned at the location where the intermediate image plane 15 is to occur. Specifically the exit pupil expanding apparatus 18 has a surface which coincides with the image plane 15. The light exiting the apparatus 18 exits over an angle θo which is larger than an angle θi of incident light. As a result the light exiting the apparatus 18 spreads over a larger surface area of the eyepiece 20. This, in turn, causes a larger exit pupil 21 to occur. Specifically, note that the cross-sectional area of light 46 (denoted by a width dimension W1 in FIG. 2) is less than the cross-sectional area of the exit pupil 21 (denoted by a width dimension W2 in FIG. 2).

The light output from the exit pupil expanding apparatus 18 travels to the eyepiece 20. The expanded exit pupil occurs slightly beyond the eyepiece 20 at a location where a viewer positions the pupil of their eye E.

FIG. 2 shows light paths for three pixels of an image to be formed on the eye E retina 23. Light impinging on the apparatus 18 results in formation of an exit pupil 21, 21', 21" at a distance d from the eyepiece 20. The part numbers 21, 21', 21" depict the exit pupil at respective points in time receiving light at differing respective angles. The light rays forming the exit pupil 21 for a given pixel impinge upon the eye's pupil 31 at a common angle. As a result, the light is focused to a point 25 on the retina 23. Such point 25 corresponds in effect to a pixel of an image.

A short time after the imaging of point 25, the scanning subsystem 16 deflects light 19 to another focal point 13' on the intermediate image plane 15. As a result, the exit pupil 21' occurs. Exit pupil 21' occurs at approximately the same 3-dimensional position relative to the eyepiece 20 as the exit pupil 21 (e.g., they are co-located in 3-dimensional space). This is evident from the common boundary points 33, 35 where the exit pupil 21, 21' forms at the eye pupil 31. Exit pupil 21' is formed by light rays impinging the eye pupil at a common angle. Such angle, however, differs from the angle of the light rays forming exit pupil 21. Due to the differing angle, the light rays forming exit pupil 21' focus at a different point 27 on the eye retina 23. Thus, by deflecting the light 19, the image point formed in the retina moves from point 25 to point 27.

FIG. 2 further depicts formation of another image point 29 at the retina 23. Such point 29 is formed as the scanning subsystem 16 deflects light 19 so as to change the current focal point location within the image plane 15 to focal point 13". In turn the altered focal point causes light rays of a different angle to define an exit pupil 21". The light rays defining the exit pupil 21" impinge the eye pupil 31 at a common angle. Such common angle differs than that for exit pupils 21, 21'. The result is a different image point 29 formed on the eye retina 23. Thus, as the scanning subsystem deflects the light 19, the light rays forming the exit pupil 21 (21', 21")at different moments in time impinge upon the eye pupil 31 at differing angles. For each variation in angle the focal point on the retina varies. As the scanning subsystem 16 deflects light 19 along a raster pattern, a raster of focal points occurs on the retina. The raster of focal points defines an image scanned directly on the retina.

For the pixels described above, at a given time the light rays defining an exit pupil are said to impinge on the eye at a common angle. For such an embodiment the eyepiece 20 preferably is positioned at one focal distance from the intermediate image plane 15. In an alternative embodiment the relative distance between the image plane 15 and eyepiece is variable. In the case where the relative distance is slightly less than one focal length, the size and apparent depth of the image formed in the viewer's eye changes.

Light Source

The light source 12 includes a single or multiple light sources. For generating a monochrome image a single monochrome source typically is used. For color imaging, multiple light sources are used. Exemplary light sources are colored lasers, laser diodes or light emitting diodes (LEDs). Referring to FIG. 3, an embodiment having a respective red photon source 22, green photon source 24 and blue photon source 26 are shown, although other colors may be used.

Although LEDs typically do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

Additional detail on these and other light source 12 embodiments are found in U.S. patent application Ser. No., 08/437,818 for "Virtual Retinal Display with Fiber Optic Point Source" filed May 9, 1995, and incorporated herein by reference.

According to alternative embodiments, the light sources or the light generated by the light sources are modulated to include red, green, and/or blue components at a given point (e.g., pixel) of a resulting image. Referring to FIG. 3 respective beams of light sources 22, 24, 26 are modulated to introduce color components at a given pixel. Red light from source 22 is output to a modulator 28 then to a beam combining apparatus 34. Green light from source 24 is output to a modulator 29 then to the beam combining apparatus 34. Lastly, blue light from source 26 is output to a modulator 30 then to the beam combining apparatus 34. The modulators 28, 29, 30 modulate the respective beams of light according to R, G and B component signals derived from the image data signal received into the display 10.

In one embodiment the beam combining apparatus 34 is formed by an arrangement of dichroic mirrors or dichroic beam splitters which direct a substantial portion of each beam into a common beam. The light output along such common path is light 36 which subsequently enters the scanning subsystem 16.

Image Data Interface

The retinal display device 10 is an output device which receives image data to be displayed. Such image data is received as an image data signal at the image data interface 11. In various embodiments, the image data signal is a video or other image signal, such as an RGB signal, NTSC signal, VGA signal or other formatted color or monochrome video or graphics signal. Referring to FIG. 3, an exemplary embodiment of the image data interface 11 extracts color component signals and synchronization signals from the received image data signal. In an embodiment in which an image data signal has embedded red, green and blue components, the red signal is extracted and routed to the modulator 28 for modulating the red light source 22 output. Similarly, the green signal is extracted and routed to the modulator 29 for modulating the green light source 24 output. Also, the blue signal is extracted and routed to the modulator 30 for modulating the blue light source 26 output.

The image data signal interface 11 also extracts a horizontal synchronization component and vertical synchronization component from the image data signal. In one embodiment, such signals define respective frequencies for horizontal scanner and vertical scanner drive signals routed to the scanning subsystem 16.

Scanning Subsystem

The scanning subsystem 16 receives the light output from the light source 12. In one embodiment the scanning subsystem 16 includes a resonant scanner 200 for performing horizontal beam deflection and a galvanometer for performing vertical beam deflection. The scanner 200 serving as the horizontal scanner receives a drive signal having a frequency defined by the horizontal synchronization signal extracted at the image data interface 11. Similarly, the galvanometer serving as the vertical scanner receives a drive signal having a frequency defined by the vertical synchronization signal VSYNC extracted at the image data interface. Preferably, the horizontal scanner 200 has a resonant frequency corresponding to the horizontal scanning frequency.

Figure 4:
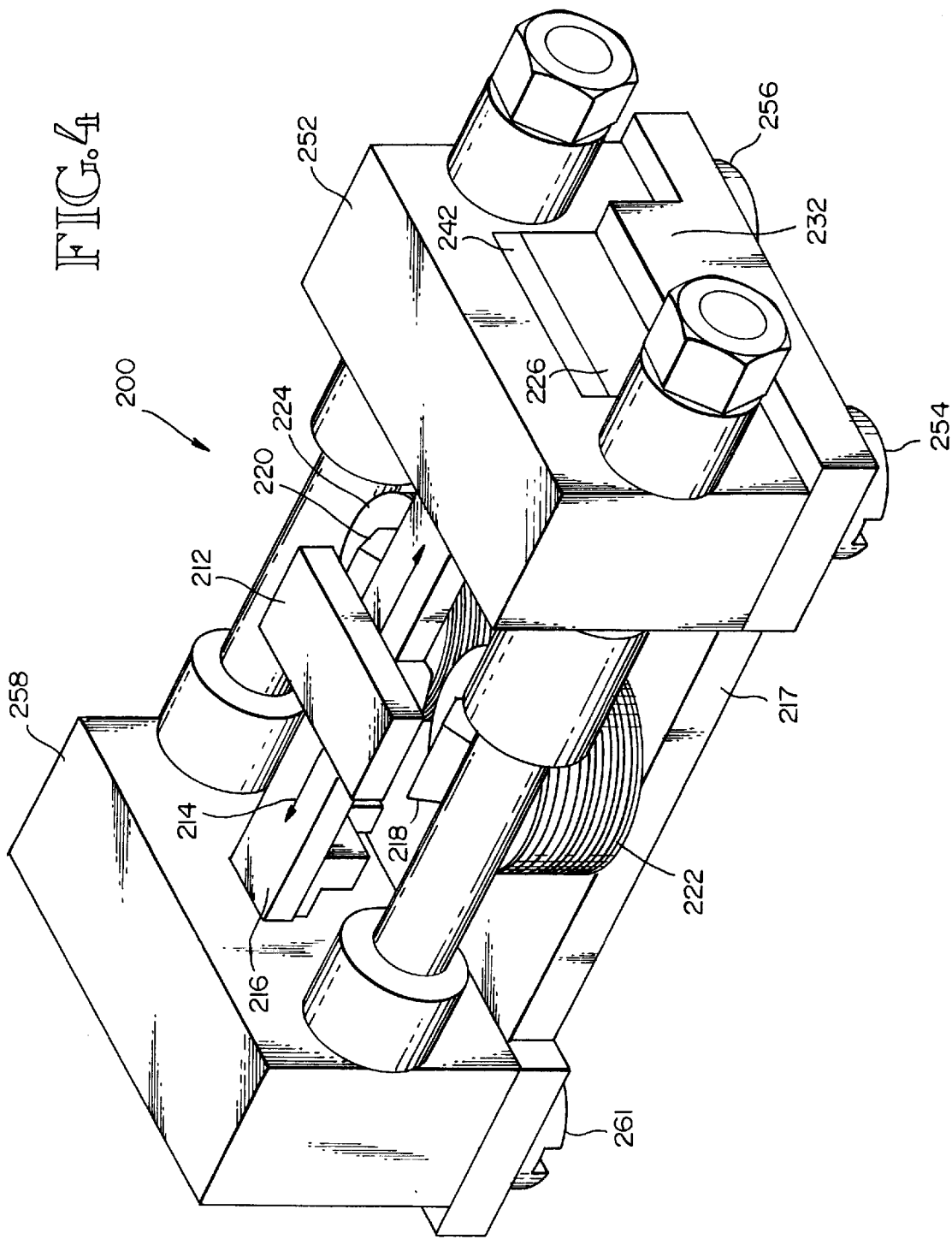
FIG. 4 is a perspective drawing of the scanning subsystem of FIG. 1 according to an embodiment of this invention.
Figure 5:
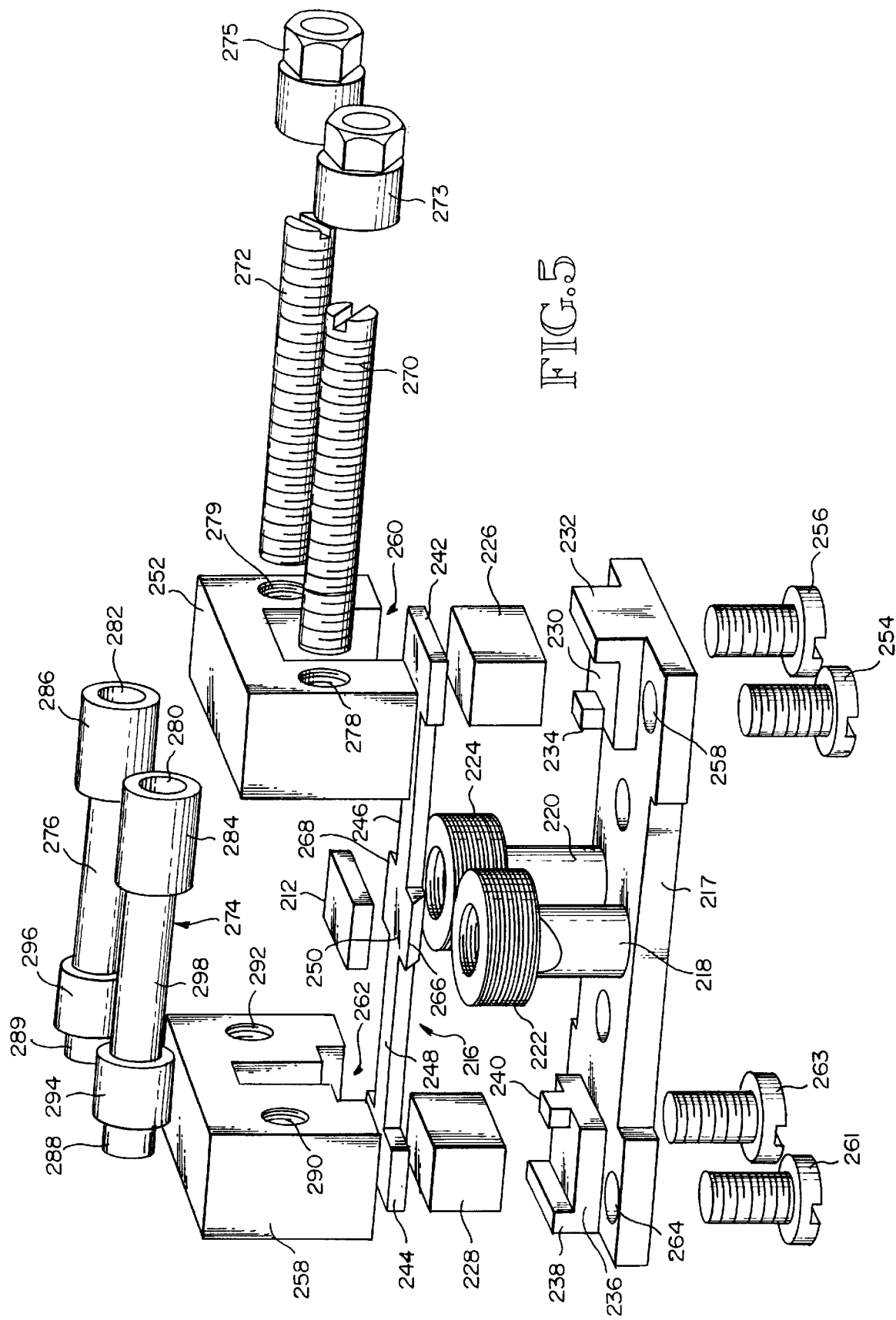
FIG. 5 is an exploded view of the scanning subsystem of FIG. 4.

Referring to FIG. 4 the scanner 200 includes a mirror 212 driven by a magnetic circuit so as to oscillate at a high frequency about an axis of rotation 214. In one embodiment the only moving parts are the mirror 212 and a spring plate 216. The optical scanner 200 also includes a base plate 217 with a pair of stator posts 218, 220 centrally located thereon. The base plate 217 and stator posts 218, 220 are integrally formed in one piece of a soft iron. Stator coils 222 and 224 are wound in opposite directions about the respective stator posts 218 and 220. The electrical coil windings 222 and 224 may be connected in series or in parallel to a drive circuit as discussed below. Mounted on opposite ends of the base plate 217 are first and second magnets 226 and 228, the magnets 226, 228 being equidistant from the stators 218 and 220. In order to locate the magnet 226, the base 217 is formed with a seat 230 having a back stop 232 extending up from one end of the seat 230 and having a front stop 234 extending up from the seat at the opposite end thereof. Similarly, to locate the magnet 228, the base 217 is formed with a seat 236 at the end of the base opposite the seat 230. The seat 236 includes a back stop 238 and a front stop 240 that extend upwardly from the seat 236 at the back and front thereof.

The spring plate 216 is formed of spring steel and is a torsional type of spring having a spring constant determined by its length and width. The spring plate 216 has enlarged opposite ends 242 and 244 that rest directly on a pole of the respective magnets 226 and 228. The magnets 226 and 228 are oriented such that they have like poles adjacent the spring plate. For example, the North poles of the magnet 226 and 228 could be adjacent the spring plate 216 with the South poles of the magnets 226 and 228 adjacent the base 217. Alternatively the South poles of both magnets 226, 228 could be adjacent the spring plate with the North pole of the magnets 226, 228 adjacent the base 217. A narrower arm portion 246, 248 of the spring plate 216 extends from each of the enlarged ends 242, 244 to an enlarged central mirror mounting portion 250 of the spring plate 216. The mirror mounting portion 250 forms the armature of the optical resonant scanner 200 and is mounted directly over the stator posts 218 and 220 such that the axis of rotation 214 of the mirror mounting portion 250 is equidistant from the stator posts 218 and 220. The mirror 212 is mounted on or coated on the mirror mounting portion 250 of the spring plate.

The spring plate 216, magnets 226 and 228 and the base 217 are tightly clamped together by respective spring plate caps 252 and 258. Each cap 252, 258 is formed as a block with openings 260 and 262. The openings 260, 262 are formed so that the caps 252, 258 can accommodate the ends 242, 244 of the spring plate, the magnets 226, 228 and the seats 230, 236 as well as the arms 246 and 248 of the spring plate 216 when the caps 252, 258 are resting on the base 217. The cap 252 is held securely to the base 217 by a pair of screws 254 and 256 so as to clamp the spring plate 216 and magnet 226 to the base. The screws 254 and 256 extend up through apertures 258 in the base 217 on opposite sides of the seat 230 and into threaded apertures formed in the cap 252 on opposite sides of the opening 260. The cap 258 is similarly clamped to the base 217 by respective screws 261 and 263 that extend up through respective apertures 264 formed on opposite sides of the cap opening 262.

Magnetic circuits are formed in the optical scanner 200 so as to oscillate the mirror 212 about the axis of rotation 214 in response to an alternating drive signal. One magnetic circuit extends from the top pole of the magnets 226 to the spring plate end 242, through the arms 246 and mirror mounting portion 250 of the spring plate 216, across a gap to the stator 218 and through the base 217 back to the magnet 226 through its bottom pole. Another magnetic circuit extends from the top pole of the magnet 228 to the spring plate end 244 through the arm 248 and mirror mounting portion 250 of the spring plate 216, across a gap to the stator 218 and through the base 217 back to the magnet 228 through its bottom pole. Similarly, magnet circuits are set up through the stator 220 as follows. One magnetic circuit extends from the top pole of the magnet 226 to the spring plate end 242, through the arm 246 and mirror mounting portion of the spring plate 216, across the gap to the stator 220 and through the base 217 back to the magnet 226 through its bottom pole. Another magnetic circuit extends from the top pole of the magnet 228 to the spring plate end 244, through the arm 248 and mirror mounting portion 250 of the spring plate 216, across the gap to the stator 220 and then through the base 217 back to the magnet 228 through its bottom pole.

When a periodic drive signal such as a square wave is applied to the oppositely wound coils 222 and 224, magnetic fields are created which cause the mirror 212 to oscillate back and forth about the axis of rotation 214. More particularly, when the square wave is high for example, the magnetic field set up by the magnetic circuits through the stator 218 and magnets 226 and 228 cause an end 266 of the mirror mounting portion 250 to be attracted to the stator 218. At the same time, the magnetic field created by the magnetic circuits extending through the stator 220 and the magnets 226 and 228 cause the opposite end 268 of the mirror mounting portion 250 to be repulsed by the stator 220. Thus, the mirror is caused to rotate about the axis of rotation in one direction. When the square wave goes low, the magnetic field created by the stator 218 repulses the end 266 of the spring plate 250 whereas the stator 220 attracts the end 268 of the spring plate portion 250 so as to cause the mirror 212 to rotate about the axis 214 in the opposite direction.

In alternative embodiments, the scanning subsystem 14 instead includes acousto-optical deflectors, electro-optical deflectors, rotating polygons or galvanometers to perform the horizontal and vertical light deflection. In some embodiments, two of the same type of scanning device are used. In other embodiments different types of scanning devices are used for the horizontal scanner and the vertical scanner.

Optics Subsystem

The optics subsystem 14 of Fog. 2 receives the output beam 46 from the scanning subsystem and converges the beam. Left undisturbed the beam converges to a focal point then diverges beyond such point. As the converging light is deflected, however, the focal point is deflected the pattern of deflection defines a pattern of focal points. Such pattern is referred to as an intermediate image plane. Referring to FIG. 2, such intermediate image plane 15 occurs as a flat plane. In an exemplary embodiment the optics subsystem 14 includes an objective lens 44 (see FIG. 3) which converges the light 36 received from the light source 12.

Exit Pupil Expanding Apparatus

Figure 6:
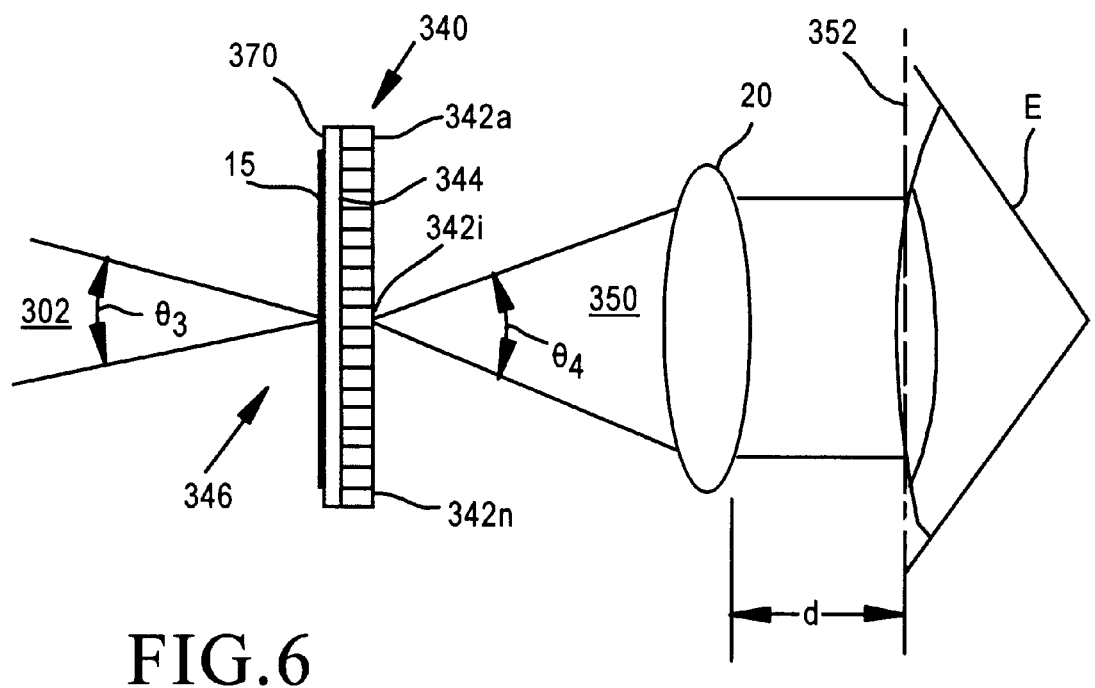
FIG. 6 is an optical diagram of the exit pupil expanding apparatus according to an embodiment of this invention.
Figure 7:
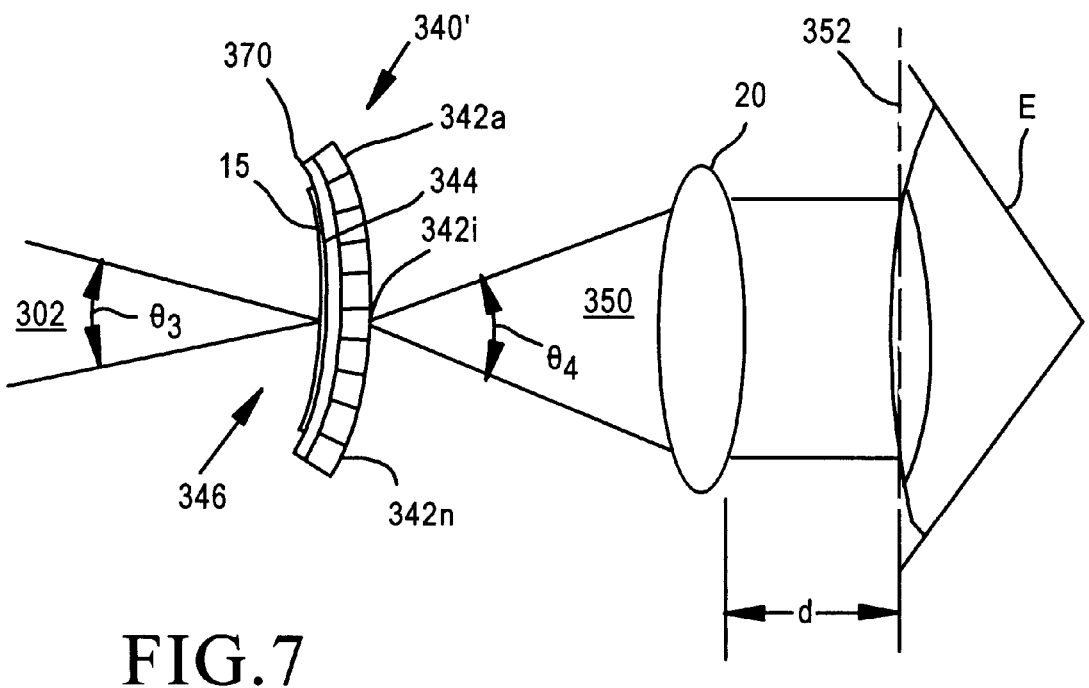
FIG. 7 is an optical diagram of the exit pupil expanding apparatus according to another embodiment of this invention.

FIG. 6 shows the light path through a flat lens array 340 embodiment of the exit pupil expanding apparatus 18. FIG. 7 shows the light path through a curved lens array 340' embodiment of the exit pupil expanding apparatus 18. The array 340, 340' includes several small lenses 342a–342n. Each lens 342i is on the order of 5–100 microns in diameter. In a preferred embodiment lenses 342i having a diameter of approximately 10 microns are used. Each lens 342i is spaced as closely as possible to each adjacent lens 342(i+1), 342 (i−1) in the array 340. In one embodiment the lens array 340 defines a diameter of 2–5 cm. The side 344 of each lens 342i facing the scanning subsystem 16 defines a plane 346. The cumulative plane 346 of the lenses coincides with the image plane 15 scanned by the scanning subsystem 15. In alternative embodiments the lens array 340 is defined as a holographic optical element.

Light 302 enters a lens 342i over a given narrow angle θ3, then exits over an enlarged angle θ4. The enlarged angle θ4 causes a larger surface of the eyepiece 20 to receive light 350. In turn the eyepiece creates a larger exit pupil 352 at the eye pupil. For each pixel imaged on the retina there is the same enlarged exit pupil. Note that for each pixel scanned, the light defining the exit pupil impinges on the eye pupil at a different angle. Thus, the light entering the eye is focused at differing points as the subsystem deflects the light 302 along a raster pattern. The differing points are, in effect, pixels of an image being scanned onto the retina.

Method for Forming the Lens Array

The lens array 340 is formed by a plurality of lenses 342. In one embodiment the lens array is flat. In another embodiment the lens array is curved. The lens array is selected as either flat or curved depending on the shape of the intermediate image plane. For a curved intermediate image plane, a curved lens array is used. For a flat intermediate image plane, a flat lens array is used.

In preferred embodiments each lens has a polymer dispersed liquid crystal (hereafter referred to as "PDLC") film at its surface. The PDLC film is a uniaxial birefringent liquid crystal material cooled in a manner for microdroplets to form in a polymer suspension. The PDLC film is formed by a polymer and nematic liquid crystal material.

In a specific embodiment AU1033 polymer is combined with E7 nematic liquid crystal at a ratio of 1.5:1. Toluene is added at a ratio of 1.5:0.5 (e.g., 0.3 grams AU1033 to 0.2 grams of E7 to 0.1 grams of Toluene). The ingredients are stirred. The resulting mixture is spread onto a glass slide. Slide spacers of the desired size for the lenses then are spun at 1000 revolutions per minute onto a separate glass slide. Both slides are heated at 100° C. for five minutes to burn the solvents. The PDLC coated slide then is pressed to the spacer coated slide. The combination then is heated at 100° C. for another five minutes, then allowed to cool. The cooling rate determines the droplet size. The desired droplet size is determined experimentally.

Figure 8:
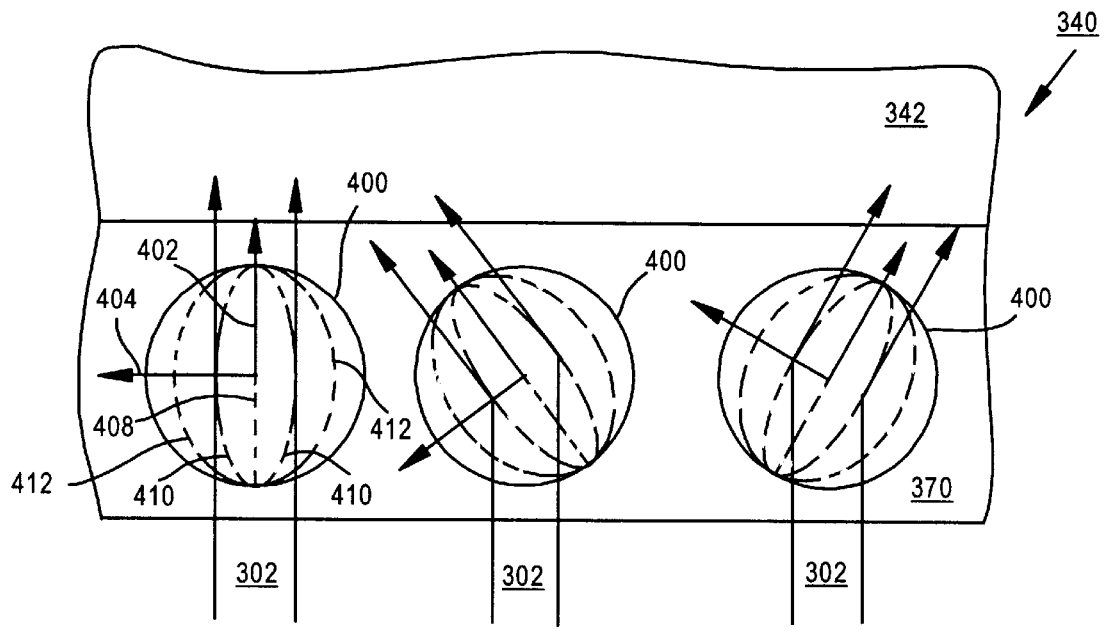
FIG. 8 is an optical diagram of the polymer dispersed liquid crystal film on the lens array of FIG. 6 according to an embodiment of this invention.

FIG. 8 shows a PDLC film 370 of droplets 400 on a lens 342. Each droplet 400 has a refractive index director associated with the droplet's ordinary axis 402 and extraordinary axis 404. At different curvatures along each director the index of refraction varies. Curved boundaries occur between the different refractive index director orientations. One border 408 has a first refractive index director orientation. Second curved borders 410 have a second refractive index director orientation. Third curved borders 412 have a third refractive index director orientation. Impinging light 302 polarized in parallel to one director axis 402 travels at a different speed than impinging light polarized perpendicular to such axis. This is due to the different optical densities along such axes 402, 404. The effect of each droplet 400 is to bend light locally at the curved boundaries 408, 310, 412 between different indices of refraction. This is referred to herein as a microlensing effect which serves to spread light passing through the lens array. The cumulative effect of the film 370 is to spread the light beam passing through the lens array, and thus, expand the exit pupil 21, 21', 21" to be formed beyond the eyepiece 20.

Figure 9:
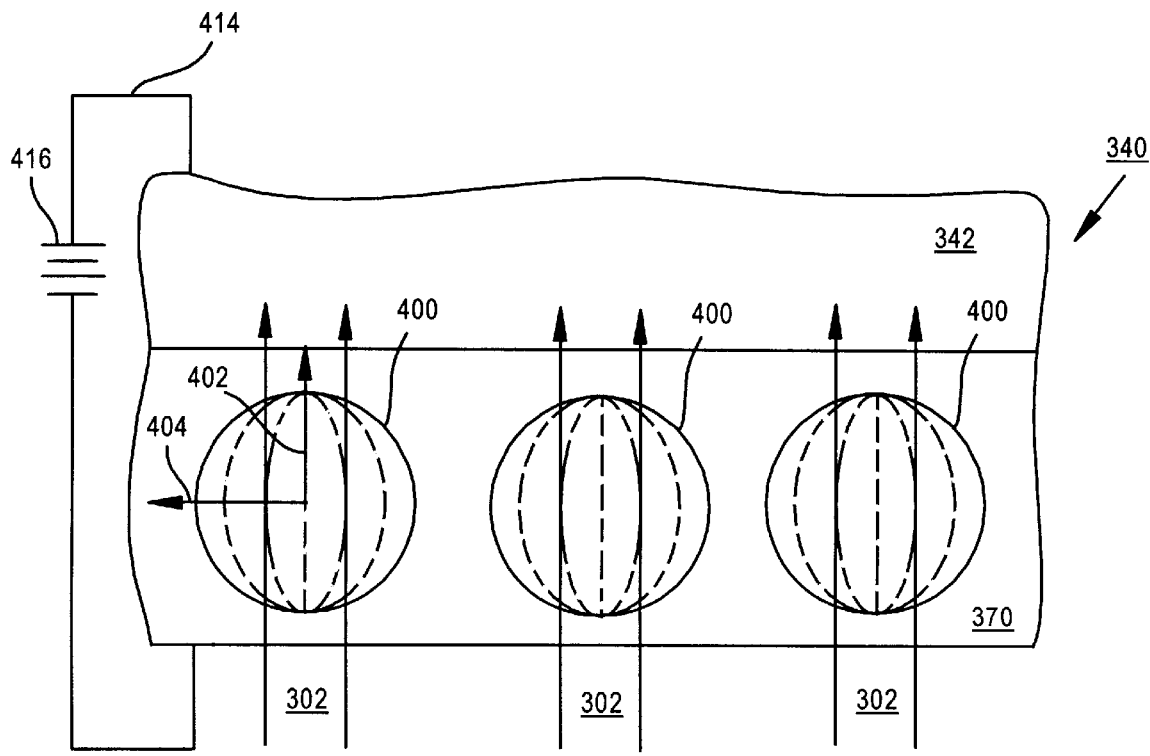
FIG. 9 is an optical diagram of the polymer dispersed liquid crystal film on the lens array of FIG. 8 according to another embodiment of this invention.

When a voltage is applied across the film 370 the ordinary axes 402 of each droplet 400 align as shown in FIG. 9. When such axes 402 are aligned the impinging light 302 is not spread, and thus the exit pupil is not expanded. Accordingly, a voltage signal 414 from a voltage source 416 is used in one embodiment to turn on and turn off exit pupil expansion.

Eyepiece

The eyepiece 20 typically is a multi-element lens or lens system receiving the light beam(s) exiting from the exit pupil enlarging apparatus 18. In an alternative embodiment the eyepiece 20 is a single lens. The eyepiece 20 serves to relay the rays from the light beam(s) toward a viewer's eye. In particular the eyepiece 20 contributes to the location where an exit pupil of the retinal display 10 forms. The eyepiece 20 defines one or more exit pupils at a known distance d from the eyepiece 20 as shown in FIGS. 2 and 6–9. Such location is the expected location for a viewer's eye E. As a result, one or more exit pupils are formed coincident with a viewer's eye, the eye being positioned adjacent to the eyepiece.

In one embodiment the eyepiece 20 is an occluding element which does not transmit light from outside the display device 10. In an alternative embodiment, an eyepiece lens system 20 is transmissive so as to allow a viewer to view the real world in addition to the virtual image. In yet another embodiment the eyepiece is variably transmissive to maintain contrast between the real world ambient lighting and the virtual image lighting. For example a photosensor detects ambient lighting. A bias voltage is generated which applies a voltage across a photochromatic material to change the transmissiveness of the eyepiece 20.

Alternative Embodiments

The components of the retinal display 10 can be made small, compact and lightweight so as to embody a hand-held display or to be mounted on a viewer's head without requiring a helmet or an elaborate head mounting support. Also the light source 12 and image data interface 11 can be separated from the rest of the display 10 to further reduce the volume and weight of the display portion adjacent to the viewer' eye. For example the modulating light emitted from the light source 12 is coupled to the optical subsystem 14 in an alternative embodiment via one or a bundle of monofilament optical fibers.

For a display device providing stereoscopic viewing two retinal display devices 10 are used. If combining two monocular systems to define binocular viewing, however, there is a potential conflict between distance cues and focus.

Figure 10:
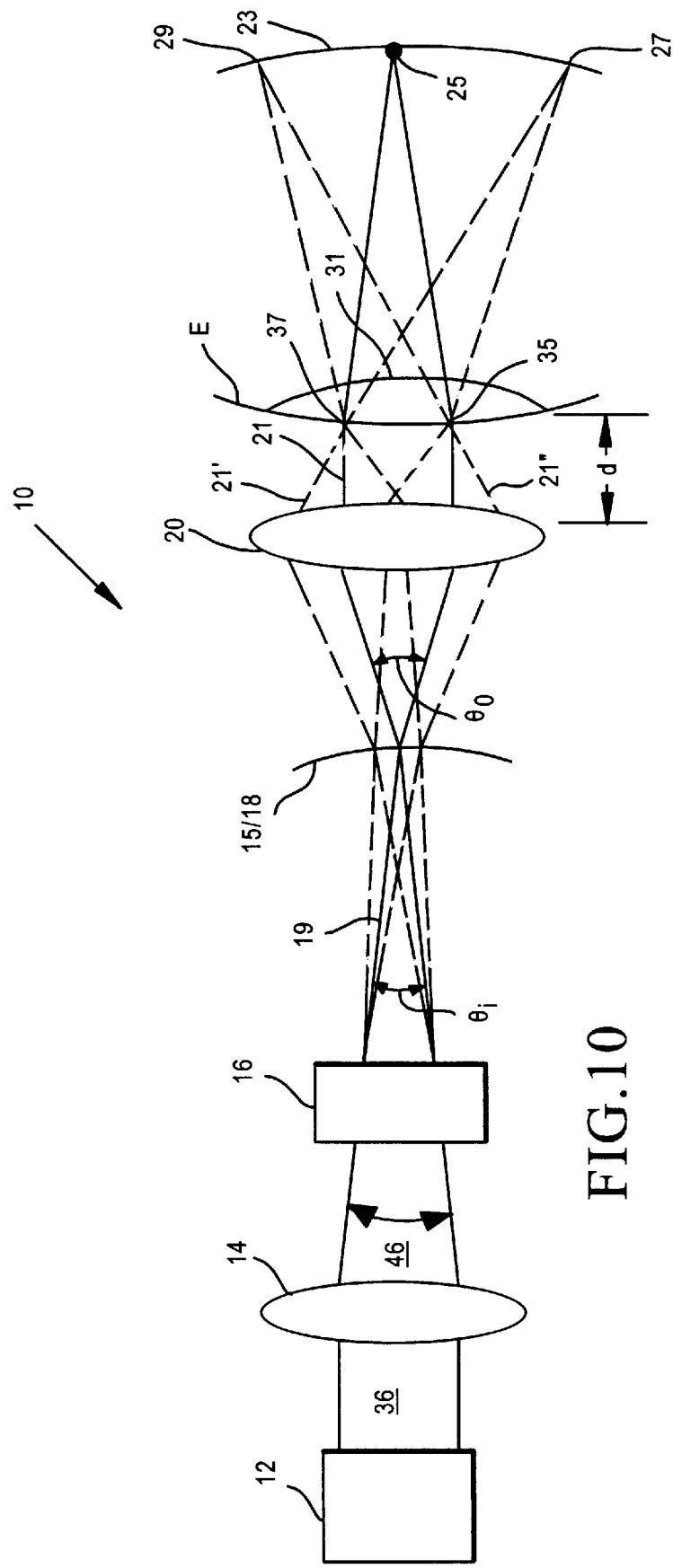
FIG. 10 is an optical schematic of the virtual retinal display according to another embodiment of this invention.

FIG. 10 shows an alternative embodiment 10' in which the scanning subsystem 16 is located between the optical subsystem 14 and the exit pupil expanding apparatus 18. The optics subsystem 14 receives the output beam 36 from the beam combining apparatus 34. In one embodiment the optics subsystem includes a cylindrical lens and an objective lens. The cylindrical lens receives light from the beam combining apparatus 34 and equalizes the divergence angle of light output from the light source. The objective lens 44 then converges the beam towards the scanner and an intermediate image plane. Left undisturbed the beam converges to a focal point then diverges beyond such point. As the converging light is deflected, however, the focal point is deflected. The pattern of deflection defines a pattern of focal points. Such pattern is referred to as the intermediate image plane. Such intermediate image plane 15 occurs as a curved image plane. The scanning subsystem 16 receives the converging light output from the optics subsystem at a position prior to the curved image plane 15. The exit pupil expanding apparatus 18 is positioned at the location where the intermediate curved image plane 15 is to occur. Specifically the exit pupil expanding apparatus 18 has a curved surface upon which light 19 impinges. Such curved surface coincides with the image plane 15. The light exiting the apparatus 18 exits over an angle θo which is larger than an angle θi of incident light. As a result the light exiting the apparatus 18 spreads over a larger surface area of the eyepiece 20. This, in turn, causes a larger exit pupil 21 to occur. Light paths are indicated by the same part numbers as the corresponding light paths of FIG. 2 for the display system 10 with flat exit pupil expanding apparatus.

Meritorious and Advantageous Effects

One advantage of this invention is that a viewer has less difficulty aligning and maintaining alignment with an exit pupil formed at the eyepiece. In particular, the expanded exit pupil makes it easier for a viewer to find an exit pupil. Another advantage with regard to the diffractive optical element embodiment is that image brightness is generally uniform among various groups of exit pupils which form at the viewer's eye.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A retinal display apparatus for receiving an image data signal and scanning an image upon a viewer's eye, comprising:

a light source for generating light;

means for modulating the light as a function of the image data signal to define image content;

means for converging the light to a focal point;

means deflecting the light for moving the focal point, over time the moving focal point defining an intermediate image plane;

a lens array upon which the light is incident for generating exit light from the incident light, the lens array being coincident with the intermediate image plane, the incident light spanning an incidence angle, the exit light spanning an angle greater than the incidence angle; and an eyepiece receiving the exit light, the exit light defining an exit pupil beyond the eyepiece through which the image is scanned upon the viewer's eye; and wherein by having the exit light span an angle greater than the incidence angle, the lens array expands the exit pupil.

2. The apparatus of claim 1, in which a first side of each one lens of a plurality of lenses within the lens array is coincident with a portion of the image plane, wherein for forming an image component at least one lens of the plurality of lenses receives the incident light over the incidence angle and outputs exit light spanning over a second angle, the second angle larger than the incidence angle so as to increase a surface area of the eyepiece which receives the exit light and enlarge the exit pupil defined by the exit light beyond the eyepiece.

3. The apparatus of claim 2, wherein said each one lens has a diameter of not more than 50 microns.

4. A retinal display apparatus for receiving an image data signal and scanning an image upon a viewer's eye, comprising:

a light source for generating light;

means for modulating the light as a function of the image data signal to define image content;

means for converging the light to a focal point;

means deflecting the light for moving the focal point, over time the moving focal point defining an intermediate image plane;

a lens array upon which the light is incident for generating exit light from the incident light, the lens array being coincident with the intermediate image plane, the incident light spanning an incidence angle, the exit light spanning an angle greater than the incidence angle; and an eyepiece receiving the exit light, the exit light defining an exit pupil beyond the eyepiece through which the image is scanned upon the viewer's eye;

wherein by having the exit light span an angle greater than the incidence angle, the lens array expands the exit pupil, and wherein the lens array comprises a plurality of lenses and a polymer dispersed liquid crystal film, the film spreading the incident light to enlarge the exit pupil defined by the exit light beyond the eyepiece.

5. The apparatus of claim 4 in which the film comprises droplets suspended in a polymer, the droplets having a differing index of refraction than the polymer.

6. A retinal display apparatus for receiving an image data signal and scanning an image upon a viewer's eye, comprising:

a light source for generating light;

means for modulating the light as a function of the image data signal to define image content;

means for converging the light to a focal point;

means deflecting the light for moving the focal point, over time the moving focal point defining an intermediate image plane;

a lens array upon which the light is incident for generating exit light from the incident light, the lens array being coincident with the intermediate image plane, the incident light spanning an incidence angle, the exit light spanning an angle greater than the incidence angle; and an eyepiece receiving the exit light, the exit light defining an exit pupil beyond the eyepiece through which the image is scanned upon the viewer's eye; and wherein by having the exit light span an angle greater than the incidence angle, the lens array expands the exit pupil, wherein the lens array comprises a plurality of lenses and a polymer dispersed liquid crystal film, the film spreading the incident light to enlarge the exit pupil defined by the exit light beyond the eyepiece, wherein the film comprises droplets suspended in a polymer, the droplets having a differing index of refraction than the polymer, and wherein the film comprises a plurality of droplets, each one of the plurality of droplets having a first axis and a second axis with an associated refractive index director, the second axis perpendicular to the first axis; and further comprising a voltage signal input to the film which aligns the first axes of the droplets to turn off exit pupil expansion.

7. A method for defining an exit pupil for a retinal display device, the retinal display device receiving an image data signal and scanning an image derived from the image data signal upon a viewer's eye, the method comprising the steps of:

generating light modulated as a function of the image data signal to define image content;

converging the light to a focal point;

deflecting the light to move the focal point, over time the moving focal point defining an intermediate image plane;

receiving the light as incident light upon a lens array having a surface which coincides with the intermediate image plane, the incident light spanning an incidence angle;

generating exit light at the lens array from the incident light, the exit light spanning an angle greater than the incidence angle, the exit light traveling to an eyepiece which bends the exit light to form an exit pupil beyond the eyepiece through which the image is scanned upon the viewer's eye; and wherein by having the exit light span an angle greater than the incidence angle, the lens array expands the exit pupil.

8. The method of claim 7, in which a first side of each one lens of a plurality of lenses within the lens array are coincident with a portion of the image plane, and wherein for forming an image component at least one lens of the plurality of lenses receives the incident light over the incidence angle and outputs exit light spanning over a second angle, the second angle larger than the incidence angle so as to increase a surface area of the eyepiece which receives the exit light and enlarge the exit pupil defined by the exit light beyond the eyepiece.

9. A method for defining an exit pupil for a retinal display device, the retinal display device receiving an image data signal and scanning an image derived from the image data signal upon a viewer's eye, the method comprising the steps of:

generating light modulated as a function of the image data signal to define image content;

converging the light to a focal point;

deflecting the light to move the focal point, over time the moving focal point defining an intermediate image plane;

receiving the light as incident light upon a lens array having a surface which coincides with the intermediate image plane, the incident light spanning an incidence angle;

generating exit light at the lens array from the incident light, the exit light spanning an angle greater than the incidence angle, the exit light traveling to an eyepiece which bends the exit light to form an exit pupil beyond the eyepiece through which the image is scanned upon the viewer's eye;

wherein by having the exit light span an angle greater than the incidence angle, the lens array expands the exit pupil, and wherein the lens array comprises a plurality of lenses and a polymer dispersed liquid crystal film, the film spreading the incident light to enlarge the exit pupil defined by the exit light beyond the eye piece.

10. The method of claim 9, in which the film comprises droplets suspended in a polymer, the droplets having a differing index of refraction than the polymer.

11. A method for defining an exit pupil for a retinal display device, the retinal display device receiving an image data signal and scanning an image derived from the image data signal upon a viewer's eye, the method comprising the steps of:

generating light modulated as a function of the image data signal to define image content;

converging the light to a focal point;

deflecting the light to move the focal point, over time the moving focal point defining an intermediate image plane;

receiving the light as incident light upon a lens array having a surface which coincides with the intermediate image plane, the incident light spanning an incidence angle;

generating exit light at the lens array from the incident light, the exit light spanning an angle greater than the incidence angle, the exit light traveling to an eyepiece which bends the exit light to form an exit pupil beyond the eyepiece through which the image is scanned upon the viewer's eye;

wherein by having the exit light scan an angle greater than the incidence angle, the lens array expands the exit pupil, wherein the lens array comprises a plurality of lenses and a polymer dispersed liquid crystal film, the film spreading the incident light to enlarge the exit pupil defined by the exit light beyond the eyepiece, and wherein the film comprises a plurality of droplets, each one of the plurality of droplets having an first axis and a second axis with an associated refractive index director, the second axis perpendicular to the first axis; and further comprising a voltage signal input to the film which aligns the first axes of the droplets to turn off exit pupil expansion.

12. A lens array, comprising:
a plurality of lenses, each one of the plurality of lenses having a first surface; and
means in contact with the plurality of lenses for spreading light impinging on the plurality of lenses, the spreading means comprising a polymer dispersed liquid crystal film covering the first surface of the plurality of lenses.

13. The lens array of claim 12, wherein light is received over a first cross-sectional area and output over a second cross-sectional area, larger than the first cross-sectional area.

14. The lens array of claim 12, in which the film comprises droplets suspended in a polymer, the droplets having a differing index of refraction than the polymer.

15. The lens array of claim 12, wherein said each one lens has a diameter of not more than 50 microns.

16. A lens array, comprising:
a plurality of lenses, each one of the plurality of lenses having a first surface; and
a polymer dispersed liquid crystal film covering the first surface of the plurality of lenses, wherein light impinging on the film is spread, in which the film comprises droplets suspended in a polymer, the droplets having a differing index of refraction than the polymer,
in which the film comprises a plurality of droplets, each one of the plurality of droplets having an first axis and a second axis with an associated refractive index director, the second axis perpendicular to the first axis, and
further comprising a voltage signal input to the film which aligns the first axes of the droplets to avoid spreading light which impinges on the film.

17. A lens array, comprising:
a plurality lenses, each one of the plurality of lenses having a first surface; and
a polymer dispersed liquid crystal film covering the first surface of the plurality of lenses, wherein light impinging on the film is spread;
wherein the film comprises a plurality of droplets suspended in a polymer, the droplets having a differing index of refraction than the polymer,each one of the plurality of droplets having an first axis and a second axis with an associated refractive index director, the second axis perpendicular to the first axis.

18. A method for defining an exit pupil for a retinal display device, the retinal display device receiving an image data signal and scanning an image derived from the image data signal upon a viewer's eye, the method comprising the steps of:

generating light modulated as a function of the image data signal to define image content;

converging the light to a focal point;

deflecting the light to move the focal point, over time the moving focal point defining an intermediate image plane;

receiving the light as incident light upon a lens array having a surface which coincides with the intermediate image plane, the incident light spanning an incidence angle, the lens array comprising a plurality of lenses and a polymer dispersed liquid crystal film, each one of the plurality of lenses having a first surface, the polymer dispersed liquid crystal film covering the first surface of the plurality of lenses, the film comprising a plurality of droplets with regions of differing indices of refraction, each one of the plurality of droplets having an first axis and a second axis with an associated refractive index director, the second axis perpendicular to the first axis;

generating exit light at the lens array from the incident light, the exit light traveling to an eyepiece which bends the exit light to form an exit pupil beyond the eyepiece through which the image is scanned upon the viewer's eye;

during a first mode, applying a voltage difference across the film of the lens array to align the respective first axes of the droplets; and during a second mode, either one of grounding or floating voltage potential at the film;

wherein during the first mode the aligned first axes passes the incident light without spreading said incident light; and wherein during the second mode the film spreads the incident light causing the exit light to occur over a second cross-sectional area larger than the first cross-sectional area.

19. A method for controlling the spread of incident light to a lens array, the lens array comprising a plurality of lenses and a polymer dispersed liquid crystal film, each one of the plurality of lenses having a first surface, the polymer dispersed liquid crystal film covering the first surface of the plurality of lenses, the film comprising a plurality of droplets with regions of differing indices of refraction, each one of the plurality of droplets having a first axis and a second axis with an associated refractive index director, the second axis perpendicular to the first axis, the method comprising the steps of:

inputting incident light over a first cross-sectional area of the lens array;

during a first mode, applying a voltage difference across the film to align the respective first axes of the droplets; and during a second mode, either one of grounding or floating voltage potential at the film;

wherein during the first mode the aligned first axes pass the incident light without spreading said incident light; and wherein during the second mode the film spreads the incident light causing light exiting the lens array to occur over a second cross-sectional area larger than the first cross-sectional area.

* * * * *